United States Patent [19]

Weathers et al.

[11] Patent Number: 4,513,288

[45] Date of Patent: Apr. 23, 1985

[54] GROUP-COMPLEMENTARY CODE SETS FOR IMPLEMENTING PULSE-COMPRESSION PROCESSING WITH OPTIMUM APERIODIC AUTOCORRELATION AND OPTIMUM CROSS-CORRELATION PROPERTIES

[75] Inventors: Glenn D. Weathers; Edward M. Holliday, both of Huntsville, Ala.

[73] Assignee: The United States of America as represented by the Secretary of the Army, Washington, D.C.

[21] Appl. No.: 362,934

[22] Filed: Mar. 29, 1982

[51] Int. Cl.³ .............................................. G01S 7/28
[52] U.S. Cl. ............................................. 343/17.2 PC
[58] Field of Search .................... 343/17.2 PC, 5 DP; 375/25, 96

[56] References Cited

U.S. PATENT DOCUMENTS

| | | | |
|---|---|---|---|
| 4,219,812 | 8/1980 | Rittenbach | 343/5 DP |
| 4,293,953 | 10/1981 | Gutleber | 375/96 |
| 4,328,495 | 5/1982 | Thue | 343/17.2 PC |

OTHER PUBLICATIONS

Colin et al., "Pulse Compression in Radars Using Binary Phase Modulation" Electrical Communication, vol. 52, No. 2, (1977), pp. 152–157.

TR-RE-81-2 Design and Implementation of a Modification to the SAM/ATU Prototype Signal Processor, G. Weathers and H. Yates, Sep. 30, (1980), Appendix A, pp. 1–26.

Primary Examiner—Maynard R. Wilbur
Assistant Examiner—K. R. Kaiser
Attorney, Agent, or Firm—Anthony T. Lane; Robert P. Gibson; Robert C. Sims

[57] ABSTRACT

A group-complementary codes provide sets of binary word groups which have the combined properties of optimized aperiodic autocorrelation and optimized cross-correlation between word sets. The optimized aperiodic autocorrelation property allows the implementation of pulse compression processing in sensor systems to achieve zero value temporal or range sidelobes within the principal interpulse period without resorting to weighting techniques for sidelobe reduction. The orthogonal nature of group-complementary codes, apparent from their absence of cross-correlation between sets, allows sensors to be deployed in close proximity, using the same carrier frequency without direct path mutual interference when synchronized.

3 Claims, 14 Drawing Figures

PULSE TRAIN WITH SAME CODE WORD $C_i$

AUTOCORRELATION OF WAVEFORM IN A.

PULSE TRAIN WITH K CODE WORDS

AUTOCORRELATION OF WAVEFORM IN C.  FIG. 5

| M(0) | 1 |
| M(1) | 1 |
| . | 1 |
| . | . |
| . | . |
| . | . |
| M(K-2) | 1 |
| 1 1 1 · · · 1 1 | 1 |

$C_0(\tau)$ $C_1(\tau)$ $C_{K-2}(\tau)$ $C_{K-1}(\tau)$ $$C(\tau) = \sum_{i=0}^{K-1} C_i(\tau)$$

GROUP-COMPLEMENTARY CODE SETS FOR IMPLEMENTING PULSE-COMPRESSION PROCESSING WITH OPTIMUM APERIODIC AUTOCORRELATION AND OPTIMUM CROSS-CORRELATION PROPERTIES

DEDICATORY CLAUSE

The invention described herein was made in the course of or under a contract or subcontract thereunder with the Government and may be manufactured, used, and licensed by or for the Government for governmental purposes without the payment to us of any royalties thereon.

BACKGROUND OF THE INVENTION

The technique of pulse compression involves the rearrangement of the temporal distribution of energy in a pulse in such a way that a long pulse with a given energy is transformed to a shorter pulse with the same energy. The instantaneous power during the shortened pulse is therefore greater than the instantaneous power during the long pulse, since the total energy is the same for both. Pulse compression is useful in target sensor systems for several reasons. Because target tracking is essentially a process of measurement of the time of arrival of a waveform, pulse compression allows a more precise measurement of arrival time and therefore of the range to the target. If the active sensor is peak power limited, as is usually the case, pulse compression allows long-pulse, limited peak power systems to have performance equivalent to a shorter-pulse higher-peak power system.

Figure 1:
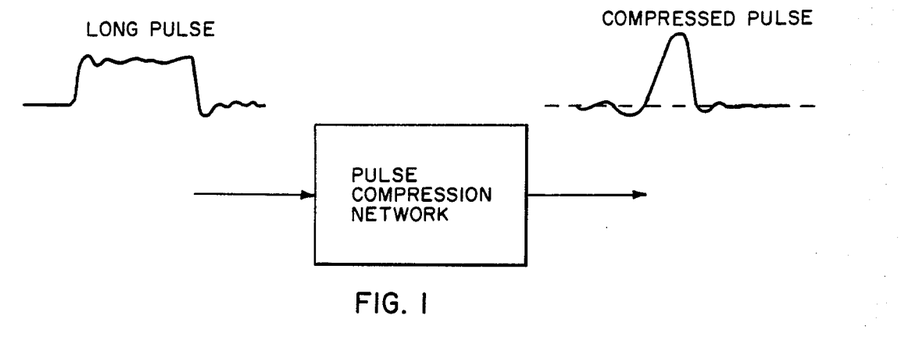
FIG. 1 illustrates pulse compression in target sensors.

Ideally, pulse compression is implemented with matched filters where the processing device is a network with impulse response matched to the time reverse of the long-pulse waveform. This matched-filter operation results in maximizing the signal-to-noise ratio and in optimum detection of the target. FIG. 1 illustrates the concept of pulse compression.

Figure 2:
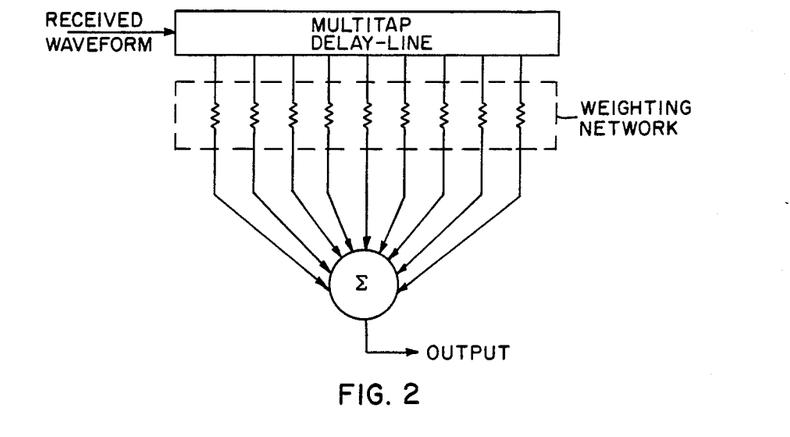
FIG. 2 illustrates a matched transversal filter for pulse compression.

Pulse-compression techniques can be implemented using trasveral filtering. Essentially, the method is to delay the energy arriving early in the long pulse period, add it coherently with the energy that arrives later in the pulse, an output the resulting shorter pulse. Two technical issues that arise in the evaluation of the effectiveness of the pulse-compression systems are sidelobes in the compressed-pulse waveform and the response of the transversed filter to other, nonmatched waveforms which may be present in the received signal. The non-matched waveforms could be the result of receiving the transmission of other deployed sensors or the result of the transmissions of intentional jammers. FIG. 2 illustrates the implementation of pulse compression using a matched transversal filter.

An array of waveforms has been used for pulse compression, including binary coding of the phase of a carrier signal (biphase modulation using binary codes). Perhaps the best-known codes for use in biphase modulation implementations of pulse compression are the Barker Codes. Other binary waveforms that have been used for pulse compression include pseudo-random codes and random binary codes. Nonbinary waveforms that have been used for pulse compression include FM modulated signals and polyphase codes.

Figure 3:
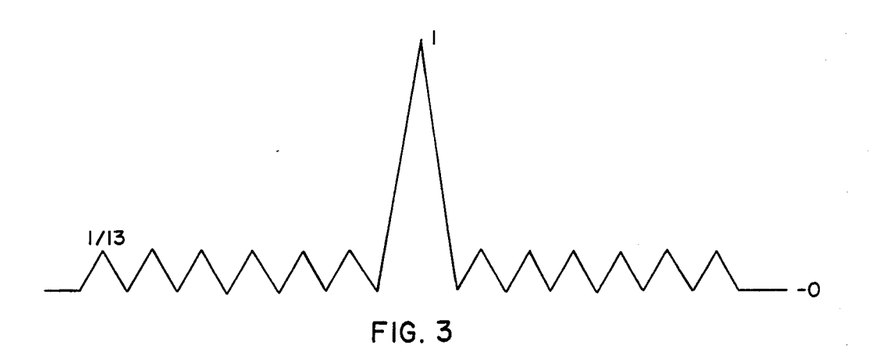
FIG. 3 illustrates the absolute value of the normalized autocorrelation function.

A problem that has limited the utility of pulse compression and correlation receivers in radar systems has been the existence of temporal/range sidelobes in the correlation function of the radar waveform. These sidelobes allow out-of-range-gate returns, such as clutter, to compete with a target in a particular range gate. A number of research efforts have addressed this problem in the past, and several waveform designs have resulted in the potential reduction or elimination of the range sidelobe problem. For example, Barker codes (also known as perfect binary words) limit the range sidelobes. FIG. 3 illustrates the correlation function of a length 13 Barker Code. Barker codes are known for lengths only up to $N=13$, and they do not match the desired "perfect" range correlation property.

Application of Golay code pairs (also known as complementary sequences) involves processing two coded pulses at a time in a radar processor to eliminate the range sidelobes. These codes have the property that when their individual range sidelobes are combined (algebraic addition), the composite sidelobes completely cancel, yielding the desired perfect correlation property. Complementary sequences are known to exist for a limited number of sequence lengths, including $N=2, 4, 8, 10, 16, 20, 32$ and $40$.

Several properties of binary code waveforms are desirable if they are to be used in implementing pulse compression in the target sensor component of a missile or fire-control system. These include very low or zero temporal sidelobes in the autocorrelation function and very low or zero cross-correlation with other binary codes that may be implemented in sensors deployed nearby. These properties would ensure that there would be little or no degradation in sensor system performance due to out-of-range clutter returns, multiple target sidelobes, or from mutual interference between deployed sensors using different codes.

Long binary codes with the desired properties are required in order to implement waveforms with large time-bandwidth products and large pulse-width compression ratios. This invention disclosure describes the structure and properties of such a waveform, called group-complementary codes.

DESCRIPTION OF THE BEST MODE AND PREFERRED EMBODIMENT

Group complementary codes are extensions of the complementary code concept introduced by Golay. The codes discussed here are matrices of K by N binary elements, and the pulse-compression processing involves transforming K long pulses, each coded with one of the K rows of N-bit binary words, into one single short pulse. Therefore, the pulse compression is a composite operation over a number of pulses rather than on a single pulse.

Figure 4:
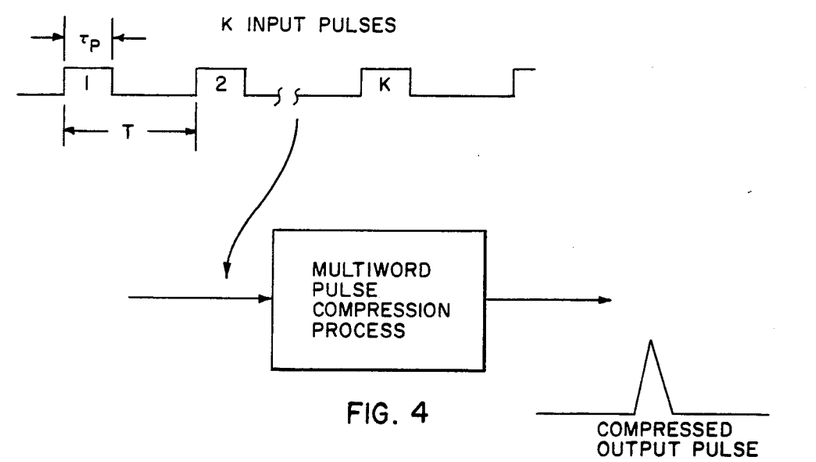
FIG. 4 illustrates multiple word pulse compression.

The implementation of the multipulse processing technique could take several forms but would necessarily require the storage of the partial correlation resulting from each of the K pulses to form the composite matrix correlation. One means of implementing the concept would utilize a Charge Coupled Device (CCD) delay line for storage of each of the K pulses correlations. The device would then provide K inputs for the formation of the composite compressed pulse. Another implementation would involve the use of one integrator to accumulate the range-time samples resulting from correlating the K pulses. FIG. 4 illustrates the multiword pulse compression concept where $\tau$ is the width of each code pulse, T is the single pulse unambigious interval, and KT is the group unambigious interval.

A binary group-complementary matrix is composed of K rows and N columns with each element being a pulse or minus "1". Each row is a code word used to encode each of K radio-frequency pulses using bi-phase modulation.

The first K-1 rows are shifted versions of the same maximal-length code word but with an extra bit of value "1" added at the end. The last row of the matrix is composed of all "1"s. Since a new matrix may be established for each unique maximal-length word, M unique matrices exist for M unique code words.

A very large set of group-complementary matrices may be generated from this configuration. An initial unique, but square, matrix may be operated upon in four different ways, in combination or separately, to generate new group-complementary code matrices while maintaining the desired and beneficial properties: (1) one or more columns may be truncated, (2) columns or rows may be interchanged, (3) one or more rows may be complemented, and (4) one or more columns may be complemented. This provides a maximum number of possible code matrices as:

$$M \sum_{N=0}^{K-1} \frac{K!}{N!(K-N)!} \cdot M!K!2^N 2^K$$

which reduces to $$M(K!)^2 2^K \sum_{N}^{K} \frac{2}{(K-N)!(K-N)!}$$

However this includes duplicate matrices and the total value only serves as a gross upper limit on the number of available matrices. For one unique maximal length code and an initial matrix with 16 rows and 15 columns this would result in an upper limit of more than $3.10 \times 10^{36}$ group-complementary code matrices as compared with $2^{NK}$ possible matrices without including truncated columns. This would be $2^{16(15)}$ or greater than $1.76 \times 10^{72}$.

Three examples of group-complementary matrices are presented in Table 1. The first is a square matrix with $N = K = 2^n$ rows and columns. Each of the first K-1 rows except for the last bit, is a shifted version of the same maximal length code. The last row is all "1"s. The second example is derived from the first by truncating the last column of the first matrix and the third example is derived from the first by truncating the last two columns.

The first code structure shown in Table 1 is an example of a square matrix, H, which satisfies $$H \cdot H^T = NI$$

where $H^T$ is the transpose of H, I is the identity matrix, and N is the order of H. Such a matrix is called a Handamard matrix if its elements are +1's and −1's and satisfy the above relation. It is clear that a group-complementary matrix with $$K = N = 2^n$$

is a Hadamard matrix where n is an integer and is the order of the maximum length sequence comprizing the first N-1 elements of each row of the matrix. All other cases of binary group-complementary matrices are truncated (columns truncated) Hadamard matrices.

TABLE 1

| Example 1: K = N = $2^n$; n an integer; (N = K = 8) | | | | | | | |
|---|---|---|---|---|---|---|---|
| −1 | −1 | −1 | 1 | 1 | −1 | 1 | 1 |
| 1 | −1 | −1 | −1 | 1 | 1 | −1 | 1 |
| −1 | 1 | −1 | −1 | −1 | 1 | 1 | 1 |
| 1 | −1 | 1 | −1 | −1 | −1 | 1 | 1 |
| 1 | 1 | −1 | 1 | −1 | −1 | −1 | 1 |
| −1 | 1 | 1 | −1 | 1 | −1 | −1 | 1 |
| −1 | −1 | 1 | 1 | −1 | 1 | −1 | 1 |
| 1 | 1 | 1 | 1 | 1 | 1 | 1 | 1 |
| Example 2: N = K − 1 = $2^n$ − 1; n an integer; (K = 8, N = 7) | | | | | | | |
| −1 | −1 | −1 | 1 | 1 | −1 | 1 | |
| 1 | −1 | −1 | −1 | 1 | 1 | −1 | |
| −1 | 1 | −1 | −1 | −1 | 1 | 1 | |
| 1 | −1 | 1 | −1 | −1 | −1 | 1 | |
| 1 | 1 | −1 | 1 | −1 | −1 | −1 | |
| −1 | 1 | 1 | −1 | 1 | −1 | −1 | |
| −1 | −1 | 1 | 1 | −1 | 1 | −1 | |
| 1 | 1 | 1 | 1 | 1 | 1 | 1 | |
| Example 3: N = K − 2; (K = 8, N = 6) | | | | | | | |
| −1 | −1 | −1 | 1 | 1 | −1 | | |
| 1 | −1 | −1 | −1 | 1 | 1 | | |
| −1 | 1 | −1 | −1 | −1 | 1 | | |
| 1 | −1 | 1 | −1 | −1 | −1 | | |
| 1 | 1 | −1 | 1 | −1 | −1 | | |
| −1 | 1 | 1 | −1 | 1 | −1 | | |
| −1 | −1 | 1 | 1 | −1 | 1 | | |
| 1 | 1 | 1 | 1 | 1 | 1 | | |

Figure 5:
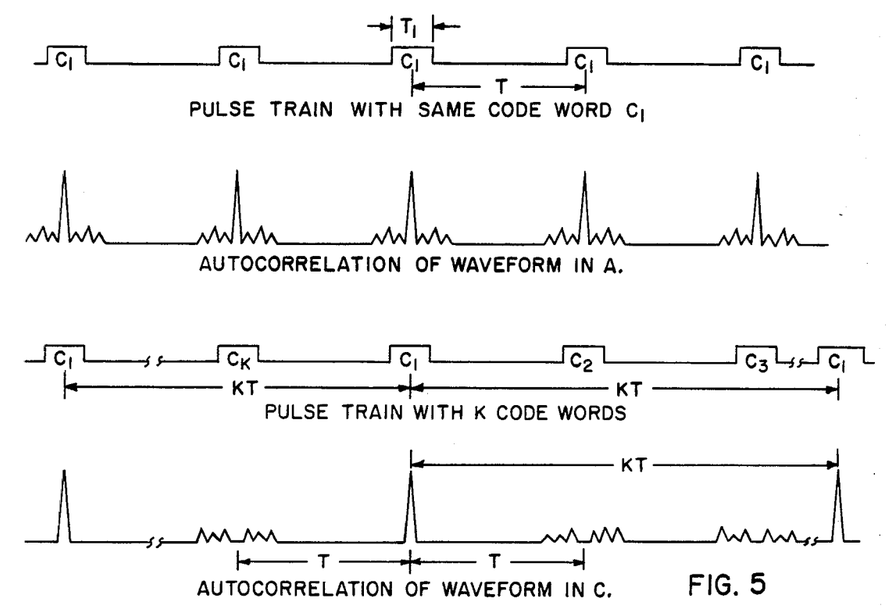
FIG. 5 is an illustration of autocorrelation of pulse trains with one code word or group-complementary code words.

Group-complementary codes have optimized autocorrelation properties; that is, all autocorrelation sidelobes within the principal interpulse period are identically zero when the autocorrelation function is formed from the composite of K pulses. FIG. 5 illustrates the autocorrelation of two repetitive waveforms, one using the same code word and the second using K code words. With K code words, the principal unambigious TABLE 2-continued

| RECEIVED WAVEFORM SENSOR A BY SENSOR S |
|---|
| 1  −1  1  −1  1  −1 |
| REFERENCE WAVEFORM |

TABLE 3

$$T_1 = \begin{bmatrix} 1 \\ 1 \\ 1 \\ 1 \\ -1 \\ -1 \\ -1 \\ -1 \end{bmatrix} \quad T_2 = \begin{bmatrix} 1 \\ 1 \\ -1 \\ -1 \\ 1 \\ 1 \\ -1 \\ -1 \end{bmatrix} \quad T_3 = \begin{bmatrix} -1 \\ 1 \\ 1 \\ -1 \\ -1 \\ 1 \\ -1 \\ 1 \end{bmatrix}$$

$$T_4 = \begin{bmatrix} 1 \\ -1 \\ -1 \\ 1 \\ 1 \\ -1 \\ 1 \\ -1 \end{bmatrix} \quad T_5 = \begin{bmatrix} -1 \\ -1 \\ 1 \\ 1 \\ 1 \\ 1 \\ -1 \\ -1 \end{bmatrix} \quad T_6 = \begin{bmatrix} 1 \\ -1 \\ 1 \\ -1 \\ -1 \\ 1 \\ -1 \\ 1 \end{bmatrix}$$

$$T_7 = \begin{bmatrix} 1 \\ -1 \\ -1 \\ 1 \\ 1 \\ -1 \\ -1 \\ 1 \end{bmatrix} \quad T_8 = \begin{bmatrix} 1 \\ 1 \\ 1 \\ 1 \\ 1 \\ 1 \\ 1 \\ 1 \end{bmatrix}$$

TABLE 4

$$T_1 = \begin{bmatrix} -1 \\ -1 \\ -1 \\ -1 \end{bmatrix} \quad T_2 = \begin{bmatrix} 1 \\ 1 \\ 1 \\ 1 \end{bmatrix} \quad T_3 = \begin{bmatrix} -1 \\ -1 \\ 1 \\ 1 \end{bmatrix} \quad T_4 = \begin{bmatrix} 1 \\ 1 \\ -1 \\ -1 \end{bmatrix}$$

$$T_5 = \begin{bmatrix} -1 \\ 1 \\ -1 \\ 1 \end{bmatrix} \quad T_6 = \begin{bmatrix} 1 \\ -1 \\ 1 \\ -1 \end{bmatrix} \quad T_7 = \begin{bmatrix} -1 \\ 1 \\ 1 \\ -1 \end{bmatrix} \quad T_8 = \begin{bmatrix} 1 \\ -1 \\ -1 \\ 1 \end{bmatrix}$$

$$T_9 = \begin{bmatrix} -1 \\ -1 \\ -1 \\ 1 \end{bmatrix} \quad T_{10} = \begin{bmatrix} 1 \\ 1 \\ 1 \\ -1 \end{bmatrix} \quad T_{11} = \begin{bmatrix} -1 \\ -1 \\ 1 \\ -1 \end{bmatrix} \quad T_{12} = \begin{bmatrix} 1 \\ 1 \\ -1 \\ 1 \end{bmatrix}$$

$$T_{13} = \begin{bmatrix} -1 \\ 1 \\ -1 \\ -1 \end{bmatrix} \quad T_{14} = \begin{bmatrix} 1 \\ -1 \\ 1 \\ 1 \end{bmatrix} \quad T_{15} = \begin{bmatrix} 1 \\ -1 \\ -1 \\ 1 \end{bmatrix} \quad T_{16} = \begin{bmatrix} -1 \\ 1 \\ 1 \\ 1 \end{bmatrix}$$

TABLE 5

| 1. | $T_1, T_3, T_5, T_7$ | 17. | $T_9, T_{11}, T_{13}, T_{15}$ |
|---|---|---|---|
| 2. | $T_2, T_3, T_9, T_7$ | 18. | $T_{10}, T_{11}, T_{13}, T_{15}$ |
| 3. | $T_1, T_4, T_9, T_7$ | 19. | $T_9, T_{12}, T_{13}, T_{15}$ |
| 4. | $T_2, T_4, T_9, T_7$ | 20. | $T_{10}, T_{12}, T_{13}, T_{15}$ |
| 5. | $T_1, T_3, T_6, T_7$ | 21. | $T_9, T_{11}, T_{14}, T_{15}$ |
| 6. | $T_2, T_3, T_6, T_7$ | 22. | $T_{10}, T_{11}, T_{14}, T_{15}$ |
| 7. | $T_1, T_4, T_6, T_7$ | 23. | $T_9, T_{12}, T_{14}, T_{15}$ |
| 8. | $T_2, T_4, T_6, T_7$ | 24. | $T_{10}, T_{12}, T_{14}, T_{15}$ |
| 9. | $T_1, T_3, T_5, T_8$ | 25. | $T_9, T_{11}, T_{13}, T_{16}$ |
| 10. | $T_2, T_3, T_9, T_8$ | 26. | $T_{10}, T_{11}, T_{13}, T_{16}$ |
| 11. | $T_1, T_4, T_9, T_8$ | 27. | $T_9, T_{12}, T_{13}, T_{16}$ |
| 12. | $T_2, T_4, T_9, T_8$ | 28. | $T_{10}, T_{12}, T_{13}, T_{16}$ |
| 13. | $T_1, T_3, T_6, T_8$ | 29. | $T_9, T_{11}, T_{14}, T_{16}$ |
| 14. | $T_2, T_3, T_6, T_8$ | 30. | $T_{10}, T_{11}, T_{14}, T_{16}$ |
| 15. | $T_1, T_4, T_6, T_8$ | 31. | $T_9, T_{12}, T_{14}, T_{16}$ |
| 16. | $T_2, T_4, T_6, T_8$ | 32. | $T_{10}, T_{12}, T_{14}, T_{16}$ |

A set of $T_i$ vectors are shown in Table 3 and these would permit generation of eight mutually orthogonal matrices from the initial seed $A_o$. If M orthogonal matrices are desired (M equal to or less than N) $M - T_i$ vectors are required.

The set of transformation vectors shown is not the only set that will synthesize a set of orthogonal group-complementary code matrices from the seed, but it serves as an example of the procedure. Specifically each vector is orthogonal to all other vectors in the set.

The number of mutually orthogonal, N matrix, sets that may be formed using a set of transformation vectors can be large. For example, for N=4, 16 $T_i$ vectors are available. Table 4 presents each vector which accounts for all 16 possible cases since N is equal to 4. Eight pairs of these vectors are complements of each other and they are not orthogonal. Therefore the pair members may not be used together. Thirty two sets of 4 orthogonal matrices may be generated using selected members of these vectors while excluding one pair member.

Table 5 presents the selection of transformation vectors, in groups of four, which may be used to generate 32 sets of matrices in which each of the four members are orthogonal among themselves.

The existence of sets of orthogonal binary group-complementary matrices allows the synthesis of a large group-complementary matrix structure with N columns and K rows and results in the condition $N > K$.

The synthesis procedure is to form a composite matrix by horizontal concatenation of all the members, or a subset of the members, of a set of mutually orthogonal group-complementary matrices. For example, a set of four mutually orthogonal group complementary matrices are shown in Table 6.

TABLE 6

$$A_o = \begin{bmatrix} -1 & -1 & 1 & 1 \\ -1 & 1 & -1 & 1 \\ 1 & -1 & -1 & 1 \\ 1 & 1 & 1 & 1 \end{bmatrix}$$

$$A_1 = \begin{bmatrix} 1 & 1 & 1 & 1 \\ 1 & -1 & -1 & 1 \\ -1 & 1 & -1 & 1 \\ -1 & -1 & 1 & 1 \end{bmatrix}$$

$$A_2 = \begin{bmatrix} 1 & -1 & -1 & 1 \\ 1 & 1 & 1 & 1 \\ -1 & -1 & 1 & 1 \\ -1 & 1 & -1 & 1 \end{bmatrix}$$

$$A_3 = \begin{bmatrix} 1 & -1 & 1 & -1 \\ 1 & 1 & -1 & -1 \\ -1 & -1 & -1 & -1 \\ -1 & 1 & 1 & -1 \end{bmatrix}$$

Using Table 6, a concatenated matrix, $[A_0 A_1 A_2 A_3]$, is interval has been increased from T to KT units and the sidelobes in the interval $\pm(T-T_i)$ have been reduced to zero. "Second-time-around" (ambigious) responses would be displaced from the peak of the autocorrelation function by a factor K as compared to the second-time-around responses in an uncoded pulse sensor system. This is analogous to the case of interpulse coding where each pulse is modulated by a single binary element.

Figure 6:
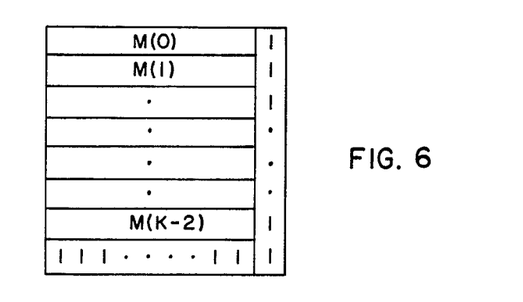
FIG. 6 illustrates the structure of a group-complementary matrix as composite of maximal length vectors and an all "1" vector.

The structure of group-complementary codes can be understood by considering each group-complementary matrix as a composite of a number of vectors, each vector being a shifted version of a maximum-length sequence, or a vector with all +1 elements. FIG. 6 shows the structure of the group-complementary matrix.

Figure 7:
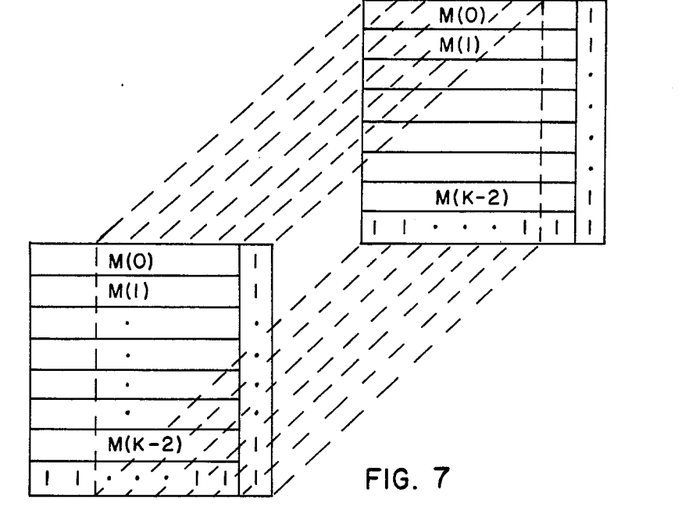
FIG. 7 illustrates the formation of an autocorrelation function for a group-complementary matrix for a particular shift.
Figure 8:
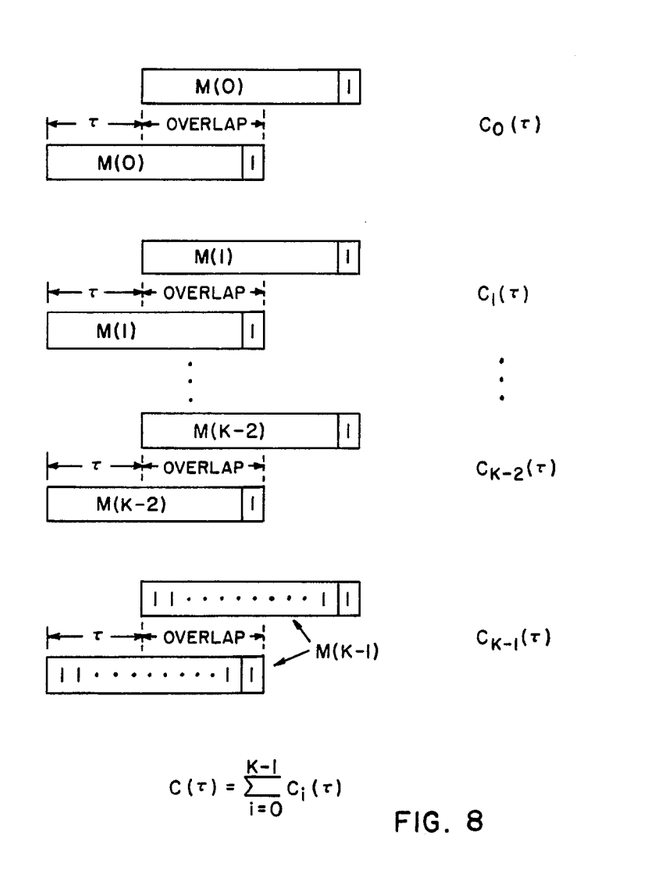
FIG. 8 illustrates details of the autocorrelation calculation for a group-complementary matrice.

The structure for calculating the correlation between a group-complementary maxtrix and a shifted version of itself, at one particular shift, is indicated in FIG. 7. The correlation for a given shift is the sum of K partial correlation results as shown in FIG. 8, where $C_i(\tau)$ is a partial correlation result, and it will be shown that $$C(\tau) = \sum_{i=0}^{K-1} C_i(\tau) = 0 \text{ for } 1 \leq \tau \leq N - 1$$

and $$C(0) = \sum_{i=0}^{K-1} C_i(0) = KN$$

Figure 9:
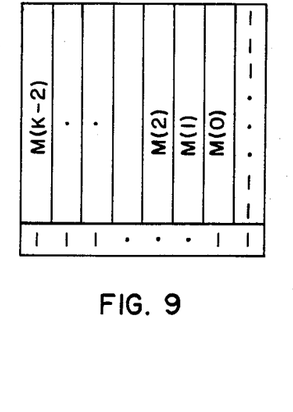
FIG. 9 illustrates an alternate interpretation of the structure of a group-complementary matrix.

The group complementary matrix can be segmented in a different but equivalent manner as shown in FIG. 9 because each column is a previously identified maximal length code arranged in the order shown.

Figure 10:
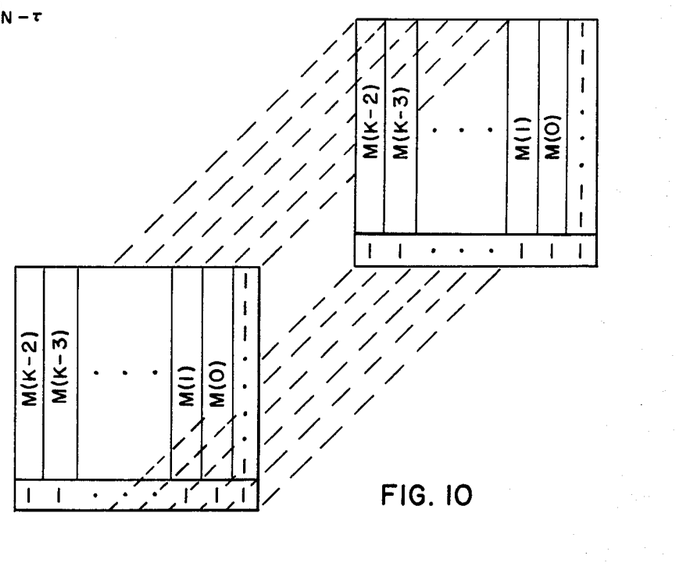
FIG. 10 illustrates an alternate formation of the autocorrelation function for a group-complementary matrix.
Figure 11:
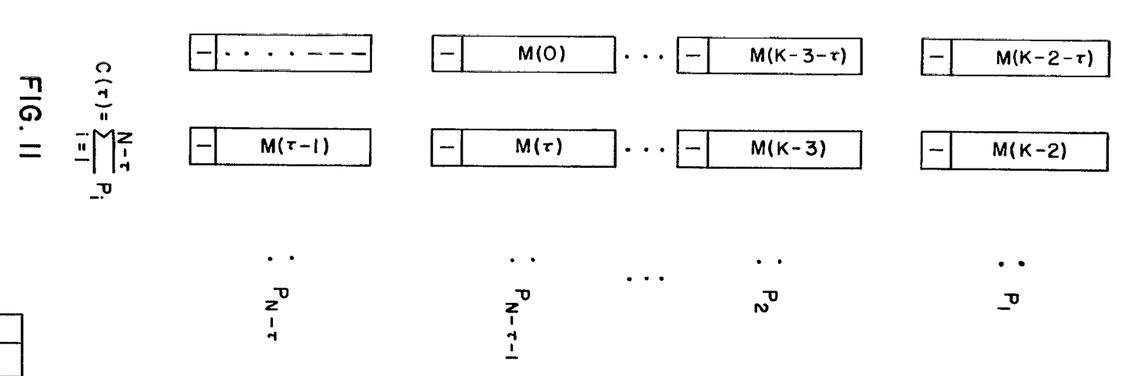
FIG. 11 illustrates the details of an alternate means of calculating the autocorrelation for group-complementary matrices.

For this alternate interpretation of the matrix of FIG. 9, the structure for calculating the correlation at a particular shift is shown in FIG. 10. The correlation is the sum of $(N-\tau)$ partial correlation results as shown in FIG. 11. From the two alternate interpretations of the matrix, with $P_i$ defined by FIG. 11, $$C(\tau) = \sum_{i=0}^{K-1} C_i(\tau) = \sum_{i=1}^{N-\tau} P_i$$

because each product of elements contributing to the sum once and only once for row to row correlation exist once and noly once in the sum for column to column correlation. In the latter there are fewer columns to add, but each column has more producted elements.

Figure 12:
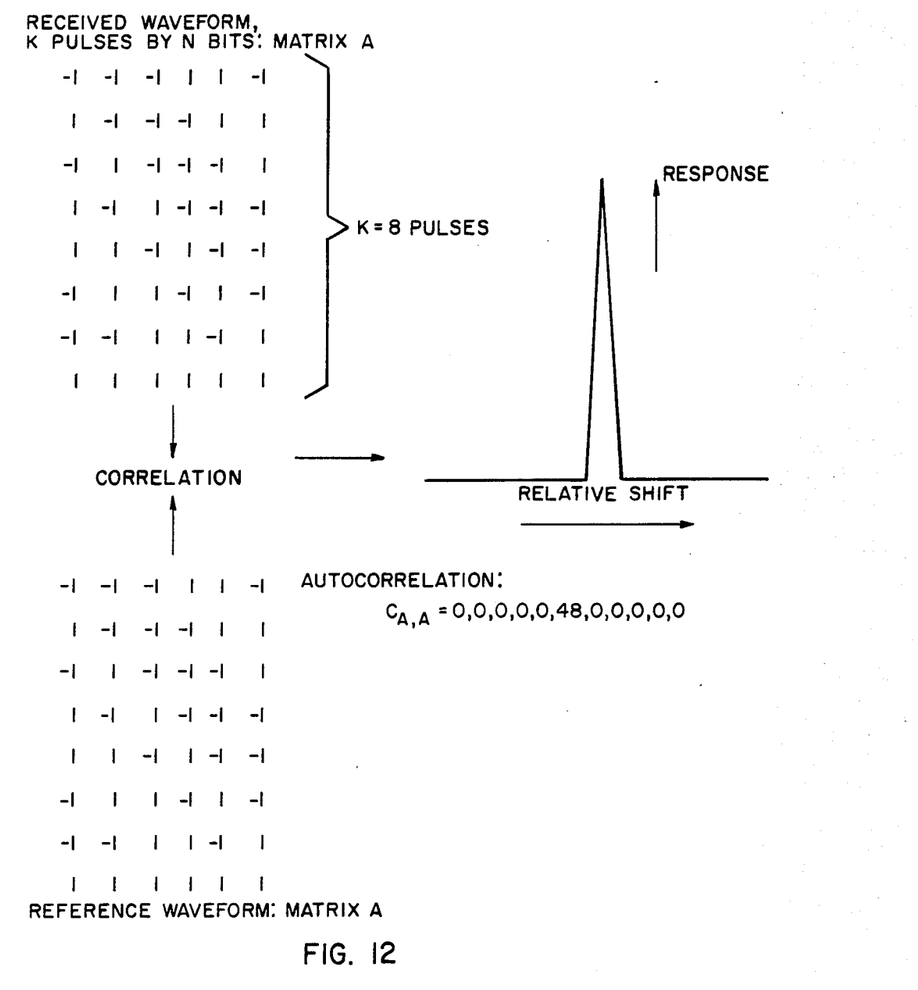
FIG. 12 illustrates pulse compression using group-complementary binary codes with optimized autocorrelation properties.

A detailed examination of the calculation of any $P_i$ term shows that if $i < N - \tau$ the calculation is the correlation of a maximum length sequence with a shifted version of itself plus a 1. This result will always be 0. If $i = N - \tau$ the calculation is the correlation of a maximum length sequence plus a 1 with an all "1" vector. This result also will always be 0. And therefore $$C(\tau) = \sum_{i=0}^{K-1} C_i(\tau) = \sum_{i=1}^{N-\tau} P_i = 0, \tau \neq 0$$

since all $P_i$ are zero. Also, $C(0) = KN$ since this is perfect correlation for no shift. An example of a group complementary matrix structure were eight code words are used, each with 6 bits, is shown in FIG. 12 with the principal portion of its autocorrelation response.

Multiple-time-around responses are observed when the received code word occurs at multiples of the unambiguous interval. This results in weak responses which appear far removed from the main peak unambiguous response. Two cases may occur, one when different code words (rows) are in phase alignment and the second when partial alignment occurs. In the first case the response is identically zero because two maximal length codes are cross-correlated when one is a shifted version of the other and the extra bit at the end of each word reduces the correlation to zero. In the second case the response will be due to the aperiodic property of the code word and can be minimized by choosing maximum-length code words with minimum aperiodic sidelobes.

Group-complementary codes have another beneficial property which can be exploited in sensor design and development. This feature involves mutual orthogonality of code matrixes. As previously discussed, the group-complementary code matrix, A, from FIG. 12 may be operated upon to create new matrices while maintaining the autocorrelation properties of the original matrix. A special case is when N is even and N/2 columns of the original matrix are inverted to form a second matrix. For this case, the cross-correlation between the two matrices is identically zero. This is an ideal property for two closely deployed sensors, whose transmissions can be synchronized, each using one of the code matrices for pulse compression. This provides mutually noninterferring operation over the unambigious interval T. Some sidelobes will be formed at time shifts greater than T but will be exactly zero again at multiples of T. Table 2 shows an example of two mutually orthogonal matrices were the second, fourth and sixth columns of the first matrix have been inverted.

From a given K by N group-complementary "seed" matrix, where N is even, a new set of N code matrices can be formed with optimized autocorrelation and mutual noninterference (orthogonal) properties. A synthesis procedure can be formulated as a matrix operation, $$A_i = A_o T_i K$$

where $A_o$ is the "seed" code matrix, $T_i$ is an N element vector with binary elements +1 and −1, and K is an N element vector with all ones, $$K = (1\ 1\ 1\ \ldots\ 1).$$

$\{T_i\}$ is a set of vectors of order N, such that, when comparing element for element between any two vectors in the set $\{T_i\}$, there are exactly N/2 agreements and N/2 disagreements.

TABLE 2

RECEIVED WAVEFORM SENSOR A BY SENSOR S

| −1 | −1 | −1 | 1 | 1 | −1 | |
|---|---|---|---|---|---|---|
| 1 | −1 | −1 | −1 | 1 | 1 | |
| −1 | 1 | −1 | −1 | −1 | 1 | |
| 1 | −1 | 1 | −1 | 1 | −1 | |
| 1 | 1 | −1 | 1 | −1 | −1 | A |
| −1 | 1 | 1 | −1 | 1 | −1 | |
| −1 | −1 | 1 | 1 | −1 | 1 | |
| 1 | 1 | 1 | 1 | 1 | 1 | |

CORRELATION →

Identically Zero Cross-correlation
$T_1 - t \leq \tau \leq t - t_1$

| −1 | 1 | −1 | −1 | 1 | 1 | |
|---|---|---|---|---|---|---|
| 1 | 1 | −1 | 1 | 1 | −1 | |
| −1 | −1 | −1 | 1 | −1 | −1 | |
| 1 | 1 | 1 | 1 | −1 | 1 | B |
| 1 | −1 | −1 | −1 | −1 | 1 | |
| −1 | −1 | 1 | 1 | 1 | 1 | |
| −1 | 1 | 1 | −1 | −1 | −1 | |

$$\begin{bmatrix} -1 & -1 & 1 & 1 & 1 & 1 & 1 & 1 & 1 & -1 & -1 & 1 & 1 & -1 & 1 & -1 \\ -1 & 1 & 1 & -1 & 1 & -1 & -1 & 1 & 1 & 1 & 1 & 1 & 1 & 1 & -1 & -1 \\ 1 & -1 & -1 & 1 & -1 & 1 & -1 & 1 & -1 & -1 & 1 & 1 & -1 & -1 & -1 & -1 \\ 1 & 1 & 1 & 1 & -1 & -1 & 1 & 1 & -1 & 1 & -1 & 1 & -1 & 1 & 1 & -1 \end{bmatrix}$$

which is a 16 column by 4 row matrix. That this matrix has group-complementary properties can be shown by observing the overlap regions in FIG. 13.

Figure 13:
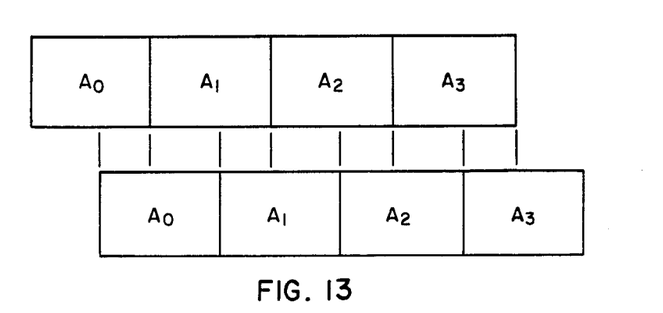
FIG. 13 illustrates group-complementary properties.

The total autocorrelation is the sum of several partial correlations, all of which are zero from the mutually orthogonal and zero sidelobe matrix property. Therefore, the new but large matrix retains the desired group-complementary properties.

Figure 14:
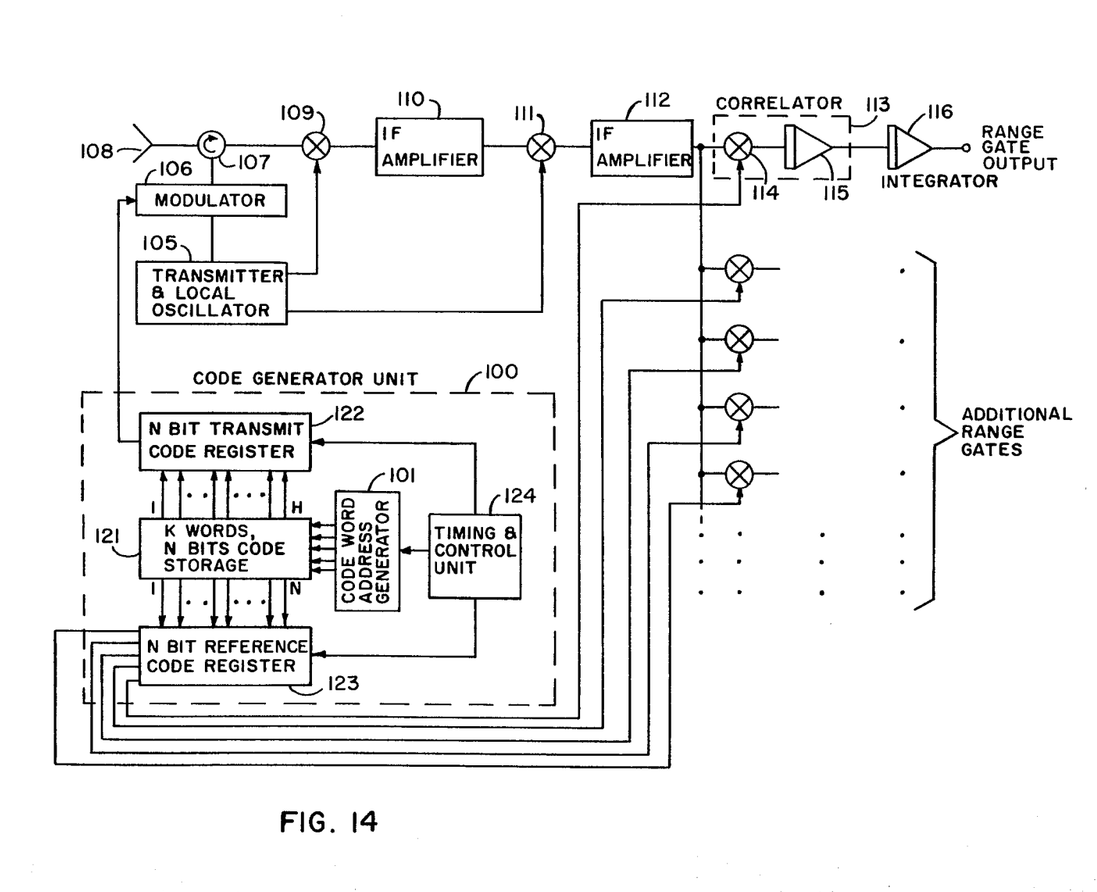
FIG. 14 is a simplified diagram of a group-complementary code implementation.

Group complementary codes may be implemented in hardware in a number of ways. One particular implementation is shown in FIG. 14. A radar seeker identified as SAM-ATU (Surface to Air Missile—Active Test Unit) is represented in the diagram. Here, K pulses are generated and transmitted at a given pulse repetition rate (PRF—pulse repetition frequency). Each pulse is encoded with N bits of bi-phase modulation. After transit delay out to the RF reflector of interest, the received signal is cross-correlated with an appropriately delay reference code. K pulses are added to form this range gate output. This process effectively accomplishes range gating, and the desired number of range gates are formed by a corresponding number of correlators.

The RF pulses to be transmitted are generated in the Transmitter/Local Oscillator Frequency Reference Unit 105. Each pulse is encoded using bi-phase modulation and this is accomplished at the Modulator 106 where the phase during the RF pulse is changed by 180 degress or not changed according to the base and video code word. The code word is developed in the Code Generator Unit 100 and it is composed of N bits of a digital word which controls the phase changes according to the bit pattern. The code word is commensurate with the RF pulse in time of occurrence and duration.

The encoded RF pulses are routed to the circulator 107 which in turn directs the RF energy to the antenna 108. The radiated pulses are received by the antenna upon reflection from objects 200 in the antenna field of view. The received pulses are routed through the circulator to the first mixer 109. Here the received signals are translated in frequency to the first Intermediate Frequency (IF) amplifier's (110) center frequency for amplification and filtering. Output of this unit is routed to the second mixer 111 for further translation and amplification at the second IF frequency. The output of the second IF amplifier 112 becomes one of the two input signals which the correlator operates upon. The second input signal to the correlator 113 is a base band code word derived in the Code Generator Unit 100. The correlators are each composed of a mixer 114 and an integrator 115 to carry out the cross-correlation functin between the received code word and the reference code word. The reference code word is a delayed version of the transmitted code word. The delay corresponds to the range of interest for a given range gate. Additional range gates are formed with additional correlators and delayed reference code words. The range gate is formed by summing the output of the correlator after each of K pulses are received. This summation is accomplished by the integrator 116 and its output becomes the range gate output.

The Code Generator Unit 100 develops the code words to be transmitted. K unique code words are transmitted before the sequence is repeated. Each correlator requires a reference code word of appropriate delay for each transmitted code word. The reference code words are also developed in the Code Generator Unit. The code words are stored in the Code Storage Unit 121, a ROM (Read Only Memory). Each code word is N bits in length and at the appropriate time is transferred to the Transmit Code Register 122 or the Reference Code Register 123. This is accomplished by the Timing and Control Unit 124 which drives the code word address generator 101. Each code word is stored at a unique address in the ROM and as each word is addressed it is transferred to the parallel-in, serial out code register for either transmission or reference. Each transmit word is shifted out of the register in serial form to encode the RF pulse while the same word is shifted in serial form out of the Code Reference Register at the correct time for a given correlator; then a one bit delayed version is shifted out on a separate line to the next correlator. The proper reference code is routed in the same fashion, with the proper shift and delay, to all other correlators. The process is then repeated with a new code word on the next transmission, with the Timing and Control Unit 124 providing the proper signals to maintain proper synchronization.

Group-complementary code sets have optimized autocorrelation and cross-correlation properties over the single pulse unambiguous interval. These properties, coupled with the relative ease of implementing biphase binary coding, make these waveforms strong candidates for sensor pulse-compression applications. The advantages of group-complementary code sets are summarized below:

Matched Filtering for Optimized Detection

Reduced sensitivity to out-of-range clutter and multi-target returns through optimized autocorrelation.

Large number of Group-Complementary Codes available.

Reduced sensitivity to mutual interference through orthogonal code sets.

Large sets of orthogonal waveforms available.

Ease of implementing the waveforms in a sensor system with read-only memory (ROM) for storage of codes and biphase carrier modulation.

We claim:

1. In a pulse compression radar system for detecting a target in which a plurality of pulses are transmitted and reflection of those pulses from the target are received, the improvement comprising the method of arranging the temporal distribution of energy in each transmitted pulse by biphased binary coding of the phase of a carrier signal in accordance with a code word; utilizing a plurality of at least three different code words in series for a series of at least three transmitted pulses; providing a corresponding reference series of code words and combining them in a range gate manner with the reflection of the transmitted pulses whereby all autocorrelation side lobes are identically zero; arranging the code words in group-complementary codes having sets of word groups comprising of at least eight rows by at least six binary elements; and providing pulse compression over at least three pulses.

2. A method as set forth in claim 1 wherein said code words are formed in mutually orthogonal groups.

3. A method as set forth in claim 1 further comprising setps of arranging each row such that the following row is a shifted version of the preceding row.

* * * * *